United States Patent
Lee

(10) Patent No.: US 8,815,437 B2
(45) Date of Patent: Aug. 26, 2014

(54) RECHARGEABLE BATTERY

(75) Inventor: Myung-Ro Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 73 days.

(21) Appl. No.: 12/870,595

(22) Filed: Aug. 27, 2010

(65) Prior Publication Data

US 2011/0059352 A1 Mar. 10, 2011

Related U.S. Application Data

(60) Provisional application No. 61/241,288, filed on Sep. 10, 2009.

(51) Int. Cl.
*H01M 10/02* (2006.01)
*H01M 2/02* (2006.01)

(52) U.S. Cl.
USPC ............ 429/156; 429/161; 429/159; 429/245

(58) Field of Classification Search
CPC ....... Y02E 60/12; H01M 2/263; H01M 2/266
USPC ............. 429/156, 158, 159, 94, 60, 211, 161, 429/233, 245, 160
See application file for complete search history.

(56) References Cited

U.S. PATENT DOCUMENTS

| | | | |
|---|---|---|---|
| 6,569,561 B1 * | 5/2003 | Kimura et al. | 429/159 |
| 7,316,863 B2 | 1/2008 | Sato | |
| 7,393,608 B2 * | 7/2008 | Cho | 429/123 |
| 7,642,005 B2 | 1/2010 | Han | |
| 7,745,041 B2 * | 6/2010 | Kozuki et al. | 429/122 |
| 8,088,509 B2 | 1/2012 | Shen et al. | |
| 8,114,537 B2 | 2/2012 | Kang et al. | |
| 8,129,049 B2 * | 3/2012 | Kim et al. | 429/210 |
| 8,492,012 B2 * | 7/2013 | Lee et al. | 429/7 |

(Continued)

FOREIGN PATENT DOCUMENTS

CN 101257130 A 9/2008
CN 101308919 A 11/2008

(Continued)

OTHER PUBLICATIONS

European Search Report, dated Nov. 29, 2010 for EP Application No. 10251581.4.

(Continued)

*Primary Examiner* — Joseph S Del Sole
*Assistant Examiner* — Nahida Sultana
(74) *Attorney, Agent, or Firm* — Knobbe, Martens, Olson & Bear, LLP

(57) ABSTRACT

A rechargeable battery is disclosed. In one embodiment, the battery includes: i) a first current collecting plate, ii) a plurality of electrode assemblies electrically connected in parallel with each other via the first current collecting plate, wherein each of the electrode assemblies comprises two opposing ends and an outer side formed between the two ends, and wherein the first current collecting plate is electrically connected to one of the two ends of the electrode assemblies and iii) a can configured to accommodate the first current collecting plate and the plurality of electrode assemblies, wherein the can comprises at least one non-linear portion, and wherein an inner surface of the non-linear portion faces the outer side of at least one electrode assembly.

23 Claims, 8 Drawing Sheets

(56) References Cited

U.S. PATENT DOCUMENTS

| | | | |
|---|---|---|---|
| 2002/0146620 A1* | 10/2002 | Connell | 429/161 |
| 2004/0197642 A1 | 10/2004 | Sato | |
| 2005/0084753 A1* | 4/2005 | Kim | 429/186 |
| 2006/0024568 A1 | 2/2006 | Lee | |
| 2006/0110658 A1* | 5/2006 | Zhu et al. | 429/208 |
| 2006/0257724 A1* | 11/2006 | Kwon et al. | 429/65 |
| 2006/0269836 A1 | 11/2006 | Yamamoto et al. | |
| 2007/0166611 A1* | 7/2007 | Oh et al. | 429/160 |
| 2007/0231701 A1* | 10/2007 | Lee | 429/246 |
| 2008/0107962 A1* | 5/2008 | Uh | 429/164 |
| 2008/0206628 A1 | 8/2008 | Honbou | |
| 2008/0286640 A1 | 11/2008 | Naito | |
| 2009/0061294 A1 | 3/2009 | Ahn | |
| 2009/0297946 A1* | 12/2009 | Yue et al. | 429/211 |
| 2009/0317713 A1* | 12/2009 | Kim et al. | 429/164 |
| 2009/0317714 A1* | 12/2009 | Maeng et al. | 429/164 |
| 2010/0015511 A1* | 1/2010 | Yoo et al. | 429/94 |
| 2010/0035144 A1* | 2/2010 | Oh et al. | 429/164 |
| 2010/0203379 A1* | 8/2010 | Meintschel et al. | 429/161 |
| 2010/0209749 A1 | 8/2010 | Okada | |
| 2010/0266891 A1 | 10/2010 | Kwon et al. | |
| 2011/0104958 A1 | 5/2011 | Kwon et al. | |
| 2011/0165444 A1 | 7/2011 | Guo et al. | |
| 2013/0104390 A1* | 5/2013 | Zhao et al. | 29/623.1 |
| 2013/0115493 A1* | 5/2013 | Fuhr et al. | 429/89 |
| 2013/0174370 A1* | 7/2013 | Saruwatari et al. | 15/300.1 |
| 2013/0280565 A1* | 10/2013 | Lee et al. | 429/71 |
| 2014/0057165 A1* | 2/2014 | Yamakaji et al. | 429/211 |
| 2014/0057167 A1* | 2/2014 | Kasai et al. | 429/211 |

FOREIGN PATENT DOCUMENTS

| | | | | |
|---|---|---|---|---|
| EP | 2 031 674 A1 | 3/2009 | | |
| EP | 2 093 820 A1 | 8/2009 | | |
| JP | 2000-100401 A | 4/2000 | | |
| JP | 2000-285871 | 10/2000 | | |
| JP | 2000-311701 A | 11/2000 | | |
| JP | 2001-185225 A | 7/2001 | | |
| JP | 2004-311165 A | 11/2004 | | |
| JP | 2005-317456 A | 11/2005 | | |
| JP | 2006-040899 A | 2/2006 | | |
| JP | 2008-135374 A | 6/2008 | | |
| JP | 2008-210729 | 9/2008 | | |
| JP | 2008-287989 A | 11/2008 | | |
| JP | 2009-059681 A | 3/2009 | | |
| JP | 2010-533953 A | 10/2010 | | |
| JP | 2010-533954 A | 10/2010 | | |
| JP | 3168282 U | 5/2011 | | |
| KR | 10-2005-0026162 A | 3/2005 | | |
| KR | 10-2008-0063525 A | 7/2008 | | |
| KR | 10-2009-0031444 | 3/2009 | | |
| WO | WO 2007/107037 A1 | 9/2007 | | |
| WO | WO2007107037 A1 * | 9/2007 | | H01M 4/02 |
| WO | WO 2007/142428 A1 | 12/2007 | | |
| WO | WO2007/142428 A1 * | 12/2007 | | H01M 2/10 |
| WO | WO 2009/011539 A2 | 1/2009 | | |
| WO | WO 2010/124635 A1 | 11/2010 | | |

OTHER PUBLICATIONS

Korean Office Action dated May 16, 2012 for Korean Patent Application No. KR 10-2010-0087994 corresponding to U.S. Appl. No. 12/870,662, filed Aug. 27, 2010, which is related to captioned U.S. Appl. No. 12/870,595.

European Office Action dated Mar. 8, 2012 for European Patent Application No. EP 10 251 581.4 which corresponds to captioned U.S. Appl. No. 12/870,595.

Korean Office Action dated Sep. 27, 2012 for Korean Patent Application No. KR 10-2010-0087993 which claims Priority from U.S. Appl. No. 61/241,288, filed Sep. 10, 2009, and captioned U.S. Appl. No. 12/870,595.

Office Action dated Sep. 7, 2012 for U.S. Appl. No. 12/870,626, filed Aug. 27, 2010, which is related to captioned U.S. Appl. No. 12/870,595.

Japanese Office Action dated Dec. 4, 2012 for Japanese Patent Application No. JP 2010-202914 which claims priority from U.S. Appl. No. 61/241,288, filed Sep. 10, 2009, and captioned U.S. Appl. No. 12/870,595.

Japanese Office Action dated Dec. 18, 2012 for Japanese Patent Application No. JP 2010-236386 which claims priority from U.S. Appl. No. 61/256,023, filed Oct. 29, 2009, and U.S. Appl. No. 12/870,662, filed Aug. 27, 2010, which are related to captioned U.S. Appl. No. 12/870,595.

Chinese Office Action dated Nov. 21, 2012 for Chinese Patent Application No. CN 201010284166.2 which claims priority of U.S. Appl. No. 61/241,288, filed Sep. 10, 2009, and captioned U.S. Appl. No. 12/870,595.

Korean Notice of Allowance dated Jan. 23, 2013 for Korean Patent Application No. KR 10-2010-0087994 which claims priority from U.S. Appl. No. 61/256,023, filed Oct. 29, 2009, and U.S. Appl. No. 12/870,662, filed Aug. 27, 2010, which are related to captioned U.S. Appl. No. 12/870,595.

U.S. Office Action dated Mar. 4, 2013 for U.S. Appl. No. 12/870,662, filed Aug. 27, 2010, which is related to captioned U.S. Appl. No. 12/870,595.

Korean Office Action dated Mar. 27, 2013 for Korean Patent Application No. KR 10-2010-0087993 which claims priority from U.S. Appl. No. 61/241,288, filed Sep. 10, 2009; and captioned U.S. Appl. No. 12/870,595.

Chinese Office Action dated Apr. 24, 2013 for Chinese Patent Application No. 201010284166.2 which claims priority from U.S. Appl. No. 61/241,288, filed Sep. 10, 2009; and captioned U.S. Appl. No. 12/870,595.

Japanese Office Action dated Jun. 18, 2013 for Japanese Patent Application No. JP 2010-236386 which claims priority from U.S. Appl. No. 61/256,023, filed Oct. 29, 2009; and U.S. Appl. No. 12/870,662, filed Aug. 27, 2010, which are related to captioned U.S. Appl. No. 12/870,595.

Notice of Allowance dated Jun. 18, 2013 for U.S. Appl. No. 12/870,662, filed Aug. 27, 2010, which is related to captioned U.S. Appl. No. 12/870,595.

Chinese Office Action dated Aug. 13, 2013 for Chinese Patent Application No. 201010284166.2 which claims priority from U.S. Appl. No. 61/241,288, filed Sep. 10, 2009; and captioned U.S. Appl. No. 12/870,595.

Japanese Office Action dated Mar. 26, 2013 for Japanese Patent Application No. JP 2010-202914 which claims priority from U.S. Appl. No. 61/241,288, filed Sep. 10, 2009; and captioned U.S. Appl. No. 12/870,595.

European Examination Report dated Sep. 11, 2013 for European Patent Application No. EP 10 251 581.4 which claims priority from U.S. Appl. No. 61/241,288, filed Sep. 10, 2009, and captioned U.S. Appl. No. 12/870,595.

The Fourth Chinese Office Action dated Feb. 8, 2014 for Chinese Patent Application No. CN201010284166.2 which claims priority from U.S. Appl. No. 61/241,288, filed Sep. 10, 2009, and captioned U.S. Appl. No. 12/870,595.

* cited by examiner

RECHARGEABLE BATTERY

RELATED APPLICATIONS

This application claims priority to and the benefit of Provisional Patent Application No. 61/241,288 filed on Sep. 10, 2009 in the U.S Patent and Trademark Office, the entire contents of which are incorporated herein by reference. This application relates to U.S. patent application entitled "Rechargeable battery", which is concurrently filed as this application and incorporated herein by reference in their entirety.

BACKGROUND

1. Field

This disclosure relates to a rechargeable battery. More particularly, this disclosure relates to a rechargeable battery having high-capacity.

2. Description of the Related Technology

A rechargeable battery can be recharged and discharged, unlike a primary battery that cannot be recharged. For example, a large-sized cylindrical battery is required for a high-capacity battery.

The above information disclosed in this Background section is only for enhancement of understanding of the background of the described technology and therefore it may contain information that does not form the prior art that is already known in this country to a person of ordinary skill in the art.

SUMMARY

An exemplary embodiment provides a rechargeable battery. Another embodiment provides a rechargeable battery solving the safety problem of high-capacity electrode assembly, decreasing the number of parts connecting cells and circuit devices, and preventing the cell swelling.

Another embodiment is a rechargeable battery, comprising: a first current collecting plate; a plurality of electrode assemblies electrically connected in parallel with each other via the first current collecting plate, wherein each of the electrode assemblies comprises two opposing ends and an outer side formed between the two ends, and wherein the first current collecting plate is electrically connected to one of the two ends of the electrode assemblies; and a can configured to accommodate the first current collecting plate and the plurality of electrode assemblies. The can may comprise at least one non-linear portion, and wherein an inner surface of the non-linear portion faces the outer side of at least one electrode assembly.

In the above battery, each of the electrode assemblies has a cylindrical shape. In the above battery, the non-linear portion comprises at least one curved shape. In the above battery, the curvature of the at least one curved side is substantially similar to that of the outer side of each electrode assembly. In the above battery, the at least one curved side contacts the outer side of at least one electrode assembly.

The above battery further comprises a second current collecting plate electrically connected to the other ends of the electrode assemblies. In the above battery, each of the electrode assemblies comprises a positive electrode, a negative electrode and a separator interposed between the positive and negative electrodes, and wherein the positive and negative electrodes are electrically connected to the first and second current collecting plates, respectively.

In the above battery, each of the positive and negative electrodes comprises a coated region and an uncoated region, and wherein the width of the positive electrode coated region is less than the width of the negative electrode coated region. The above battery further comprises: a cap plate configured to close the can; an electrode terminal formed on the cap plate; and a connection member configured to electrically connect the electrode terminal and the first current collecting plate, wherein the connection member is further configured to support the electrode assemblies so that the electrode assemblies do not move in the can.

In the above battery, the can comprises two opposing ends, wherein the cap plate is located on one end, wherein the electrode terminal is configured to perform as one of the positive and negative terminals of the battery, and wherein the other end of the can is configured to perform as the other terminal of the battery. In the above battery, the electrode assemblies are arranged so as to form a single row inside the can. In the above battery, the electrode assemblies are arranged so as to form a plurality of rows inside the can.

Another embodiment is a rechargeable battery, comprising: a first current collecting plate; a plurality of cylinder-type electrode assemblies electrically connected in parallel with each other via the first current collecting plate, wherein each of the electrode assemblies comprises two opposing ends and a cylindrical side, wherein the first current collecting plate is electrically connected to one of the two ends of the electrode assemblies, respectively, and wherein the electrode assemblies are not surrounded by an adhesive medium; and a can configured to accommodate the first current collecting plate and the plurality of cylinder-type electrode assemblies, wherein the can is configured to sufficiently tightly support the electrode assemblies so that the electrode assemblies do not move inside the can.

The above battery further comprises a second current collecting plate electrically connected to the other ends of the electrode assemblies. In the above battery, the can comprises two opposing ends, and wherein the battery further comprises a cap plate configured to close one end of the can, and wherein the second current collecting plate is directly connected to the other end of the can. The above battery further comprises: a cap plate configured to close the can; an electrode terminal formed on the cap plate; and a connection member configured to electrically connect the electrode terminal and the first current collecting plate, wherein the connection member is further configured to support the electrode assemblies so that the electrode assemblies do not move in the can.

In the above battery, the can comprises two curved sides, wherein each curved side has a curvature, and wherein the two curvatures are different. In the above battery, the electrode assemblies are arranged so as to form a plurality of rows. In the above battery, each of the electrode assemblies comprises a positive electrode, a negative electrode and a separator interposed between the positive and negative electrodes, wherein each of the positive and negative electrodes comprises a coated region and an uncoated region, and wherein the width of the positive electrode coated region is less than the width of the negative electrode coated region.

Another embodiment is a rechargeable battery, comprising: a first current collecting plate; a second current collecting plate; a plurality of electrode assemblies electrically connected in parallel with each other via the first and second current collecting plates, wherein each of the electrode assemblies comprises two opposing ends and an outer side formed between the two ends, and wherein the first and second current collecting plates are electrically connected to the two ends of the electrode assemblies; a can, comprising two opposing ends, configured to accommodate the two current collecting plates and the plurality of electrode assemblies, wherein the can comprises at least one non-linear portion, and wherein an inner surface of the non-linear portion faces the outer side of at least one electrode assembly; and a cap plate configured to close one end of the can, wherein one of the two current collecting plates is directly connected to the other end of the can.

DETAILED DESCRIPTION

Figure 1:
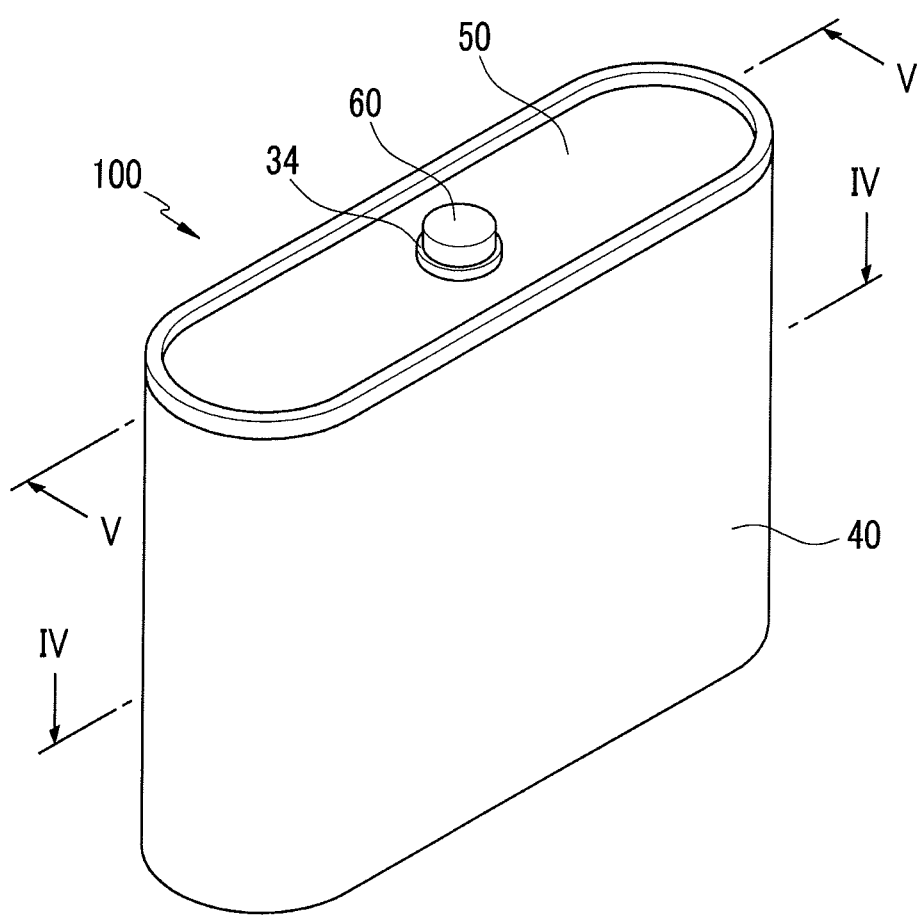
FIG. 1 is a perspective view of a rechargeable battery according to a first embodiment.

Assuming that they provide the same capacity, one large-sized cylindrical battery may be advantageous over a plurality of a smaller-sized cylindrical batteries which are connected to each other, because the number of parts connecting cells or circuit devices is reduced. However, the large-sized cylindrical battery can cause several problems.

For example, when the electrode assembly is spiral-wound in a Jelly Roll shape in order to provide a high-capacity rechargeable battery, the more number of revolutions is needed than that of a low-capacity rechargeable battery.

As the number of spiral-winding revolutions increases, the difference between the area of the positive electrode and that of the negative electrode in the electrode assembly increases and provides a safer cylindrical battery. However, as the large-sized cylindrical battery has a high-capacity electrode assembly, it may increase the explosive power of a cylindrical battery which deteriorates the safety of a rechargeable battery.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
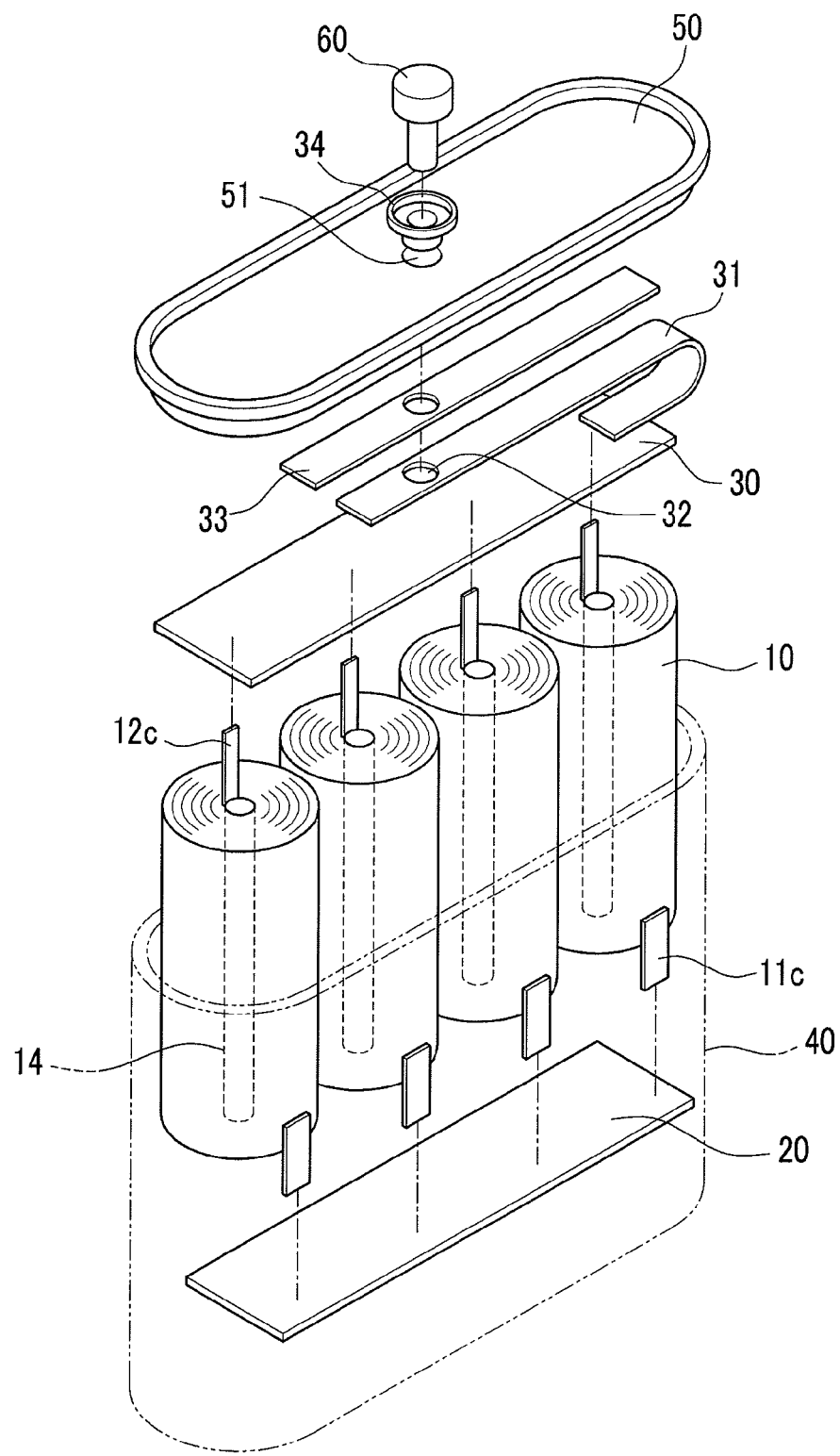
FIG. 2 is an exploded perspective view of FIG. 1.

FIG. 1 is a perspective view of a rechargeable battery according to a first embodiment, and FIG. 2 is an exploded perspective view of FIG. 1. Referring to FIG. 1 and FIG. 2, the rechargeable battery 100 according to one embodiment includes a plurality of electrode assemblies 10, a first current collecting plate 20 (hereinafter, interchangeably used with "lower current collecting plate"), a second current collecting plate 30 (hereinafter, interchangeably used with "upper current collecting plate"), a can 40, a cap plate 50, and an electrode terminal 60. The rechargeable battery 100 may be formed by housing a plurality of electrode assemblies 10 in the can 40.

Figure 3:
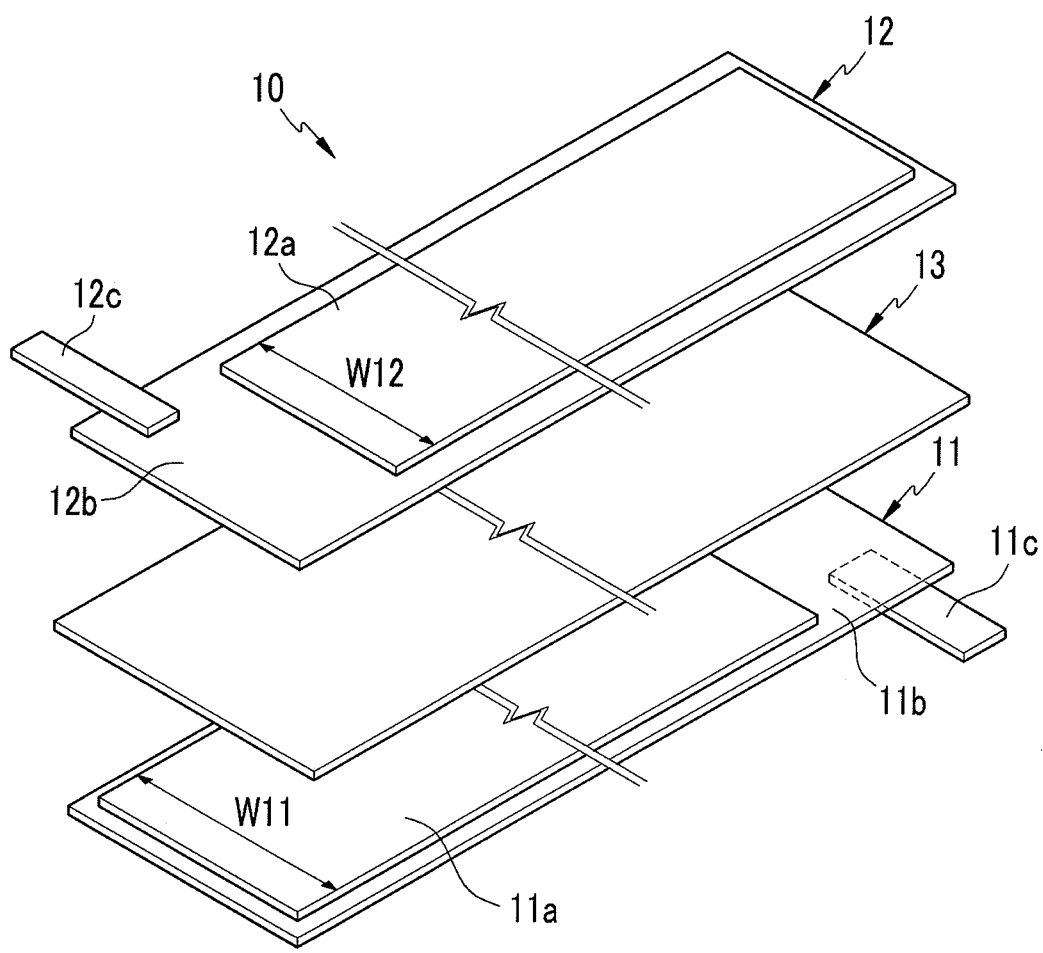
FIG. 3 is an exploded perspective view of an electrode assembly.
Figure 4A:
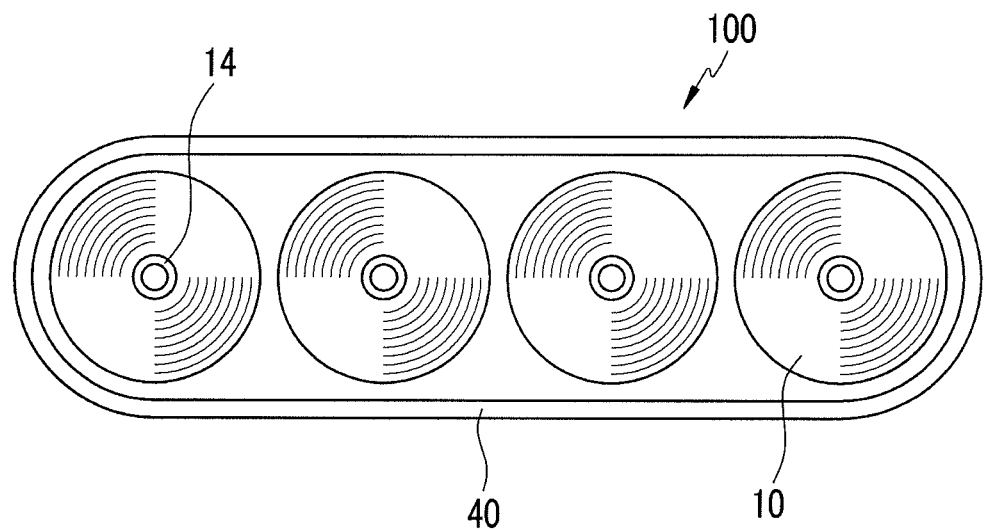
FIG. 4A is a cross-sectional view taken along the line IV-IV of FIG. 1.

The rechargeable battery 100 can accomplish high-capacity, and provide safety by connecting a plurality of low-capacity electrode assemblies 10 in parallel. The rechargeable battery 100 can also minimize or prevent explosion, as the explosive power of the smaller batteries is significantly less than that of a large sized rechargeable battery. FIG. 3 is an exploded perspective view of an electrode assembly, and FIG. 4A is a cross-sectional view taken along the line IV-IV of FIG. 1. In one embodiment, as shown in FIGS. 3 and 4A, the electrode assembly 10 is formed in a Jelly Roll shape by spiral-winding the negative electrode 11, the positive electrode 12, and an insulator separator 13 interposed therebetween. In one embodiment, the electrode assembly 10 may be cylindrical. In one embodiment, a sector pin 14 is disposed in the center of the cylindrical electrode assembly 10 to maintain the cylinder shape of the electrode assembly 10 (See FIG. 4A).

In one embodiment, each of the negative electrode 11 and positive electrode 12 includes a current collector, for example, formed of thin film metal foil. The electrodes 11 and 12 may also include coated regions 11a and 12a where the active material is coated on the current collector and uncoated regions 11b and 12b where the active material is not coated on the current collector. In one embodiment, as shown in FIG. 3, the uncoated regions 11b and 12b are disposed in the opposite end sides with respect to the coated regions 11a and 12a, respectively.

A first lead tab 11c (hereinafter, interchangeably used with "negative lead tab") is connected to the uncoated region 11b of the negative electrode 11; a second lead tab 12c (hereinafter, interchangeably used with "positive lead tab") is connected to the uncoated region 12b of the positive electrode 12.

Accordingly, in the cylindrical electrode assembly 10 in which the negative electrode 11, the separator 13, and the positive electrode 12 are wound, the negative lead tab 11c is protruded toward one direction (e.g., downward) in the exterior surface of the electrode assembly 10; the positive lead tab 12c is protruded toward the opposite direction (e.g., upward) of the negative lead tab 11c in the center of the electrode assembly 10 (See FIG. 2).

In addition, since a plurality of electrode assemblies 10 are disposed in one can 40, it is formed in a cylinder having smaller volume than the entire volume of the cap 40.

Accordingly, as the number of winding the electrode assembly 10 is decreased, it is possible to minimize the width difference (W11-W12) between the negative electrode 11 and positive electrode 12 for maintaining the safety of the rechargeable battery 100. Thereby, it is possible to prevent the rechargeable battery 100 from deteriorating the capacity while maintaining a smaller size.

The safety of the rechargeable battery 100 is ensured by preventing the coated region 12a of the positive electrode 12 and the coated region 11a of the negative electrode 11 from being a short-circuit each other.

Figure 4B:
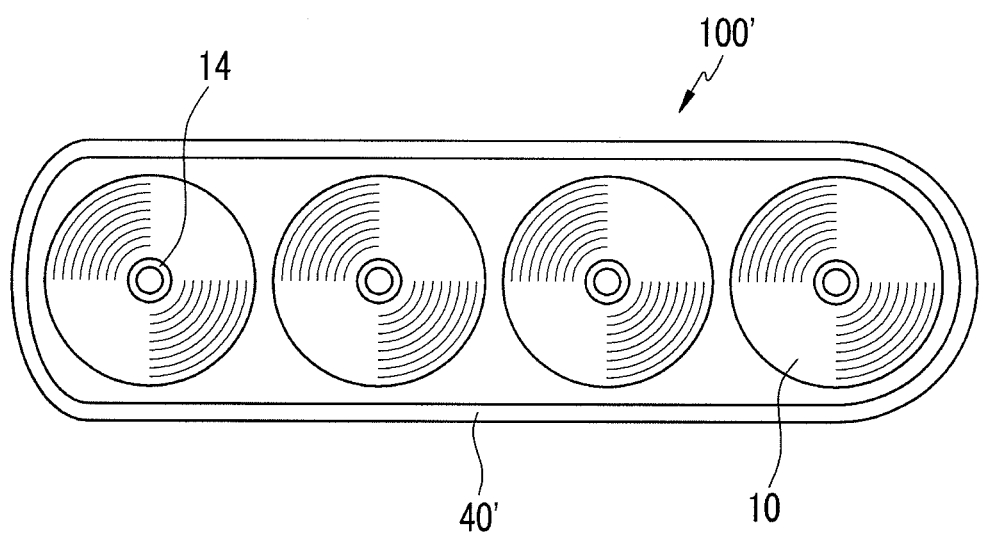
FIG. 4B is a cross-sectional view of a rechargeable battery according to a modification of the first embodiment.

For this purpose, the width (W12) of the coated region 12a of the positive electrode 12 is formed to be less (W12<W11) than the width (W11) of the coated region 11a of the negative electrode 11. As the number of winding the electrode assembly 10 is decreased, the width difference (W11-W12) required for maintaining the safety of the rechargeable battery 100 may be minimized. In one embodiment, the can 40 may include at least one non-linear portion. The non-linear portion may include at least one curved shape. The curvature of the at least one curved side may be substantially similar to or substantially the same as that of the outer side of each electrode assembly 10. The at least one curved side may contact the outer side of at least one electrode assembly 10. The can may include two curved sides. In one embodiment, each curved side has a curvature, and the two curvatures are substantially the same as or substantially similar to each other, for example, as shown in FIG. 4A. In a rechargeable battery 100' according to a modification of the first embodiment, the two curvatures may be different, for example, as shown in FIG. 4B. The description of this paragraph also applies to FIGS. 2 and 4-7.

Figure 5:
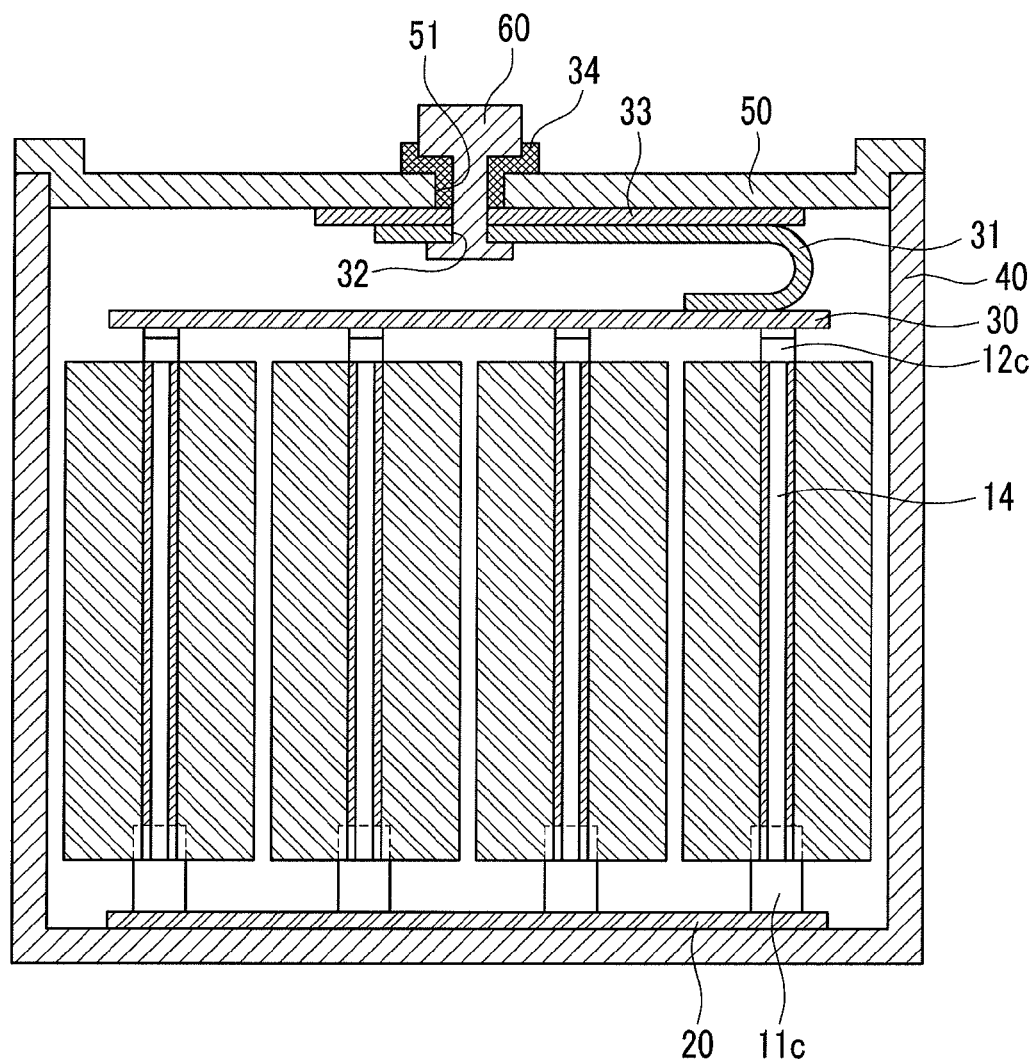
FIG. 5 is a cross-sectional view taken along the line V-V of FIG. 1.

FIG. 5 is a cross-sectional view taken along the line V-V of FIG. 1. In one embodiment, as shown in FIG. 5, in each electrode assembly 10, the negative lead tabs 11c are protruded toward the upward of the electrode assembly 10 and welded and connected to a lower current collecting plate 20 disposed under the electrode assemblies 10.

In one embodiment, the positive lead tabs 12c are protruded toward the upside of the electrode assembly 10 and welded and connected to an upper current collecting plate 30 disposed above the electrode assemblies 10. In one embodiment, the electrode assemblies 10 are connected in parallel by the lower current collecting plate 20 and the upper current collecting plate 30, so as to accomplish a high-capacity battery.

As shown in the first embodiment, the can 40 may be provided in a modified prismatic shape such that one side is open in order to insert and accommodate a plurality of electrode assemblies 10. The corner part of the prismatic shape may be modified into the curved surface corresponding to the exterior shape of the electrode assembly 10.

As the can 40 has space capable of accommodating a plurality of low-capacity cylindrical electrode assemblies 10, it is possible to provide a high-capacity rechargeable battery. Accordingly, when a plurality of rechargeable batteries 100 are connected to each other, it is possible to decrease the number of parts or circuit devices and to prevent the cell swelling.

In one embodiment, the can 40 having curved both end surfaces in a row direction of electrode assemblies 10 may contact the exterior shape of the outermost electrode assemblies 10 (See FIGS. 2 and 4), so it is possible to effectively prevent the shaking of the electrode assemblies 10 in the inserted state of the electrode assemblies 10. In the inserted state of the electrode assembly 10 in the can 40, the can 40 may be welded to the lower current collecting plate 20.

In one embodiment, when a negative lead tab 11c is connected to the lower current collecting plate 20, the can 40 connected to the lower current collecting plate 20 may play a role of a negative terminal in the rechargeable battery 100. In addition, when a positive lead tab is connected to the lower current collecting plate in the electrode assembly, the can 40 connected to the lower current collecting plate may play a role of a positive terminal in the rechargeable battery (not shown). The can 40 may be formed of a conductive metal such as iron or aluminum.

In one embodiment, when the can 40 is connected to the negative electrode 11 of the electrode assemblies 10 to play a role of a negative terminal, the can 40 may be formed of iron. In addition when the can is connected to the positive electrode of the electrode assemblies 10 to play a role of a positive terminal, the can 40 may be formed of aluminum having superior conductivity to iron (not shown).

The cap plate 50 is connected to the opening of the can 40 where the electrode assemblies 10 are inserted. The cap plate 50 may seal the can 40 which accommodates the electrode assemblies 10 and an electrolyte solution.

An electrode terminal 60 is mounted in the cap plate 50 to connect the positive electrode 12 of the electrode assembly 10 inside the can 40. The electrode terminal 60 is connected to an upper current collecting plate 30 through a connecting member 31. For example, the connection member 31 is welded and connected to an upper current collecting plate 30 in one end, and the other end thereof is electrically connected to the electrode terminal 60 with providing a connecting opening 32. In other words, the electrode terminal 60 may be electrically connected to the positive electrodes 12 of the electrode assemblies 10 through the connection member 31 and the upper current collecting plate 30.

In addition, the cap plate 50 may be electrically connected to the negative electrode 11 of the electrode assemblies 10 through the can 40. Accordingly, the connecting member 31 and the electrode terminal 60 electrically connected to the positive electrode 12 may provide an electrical insulation structure together with the cap plate 50. For example, a lower insulator 33 is interposed between the cap plate 50 and the connecting member 31 to electrically insulate between the connecting member 31 and the cap plate 50.

Figure 6:
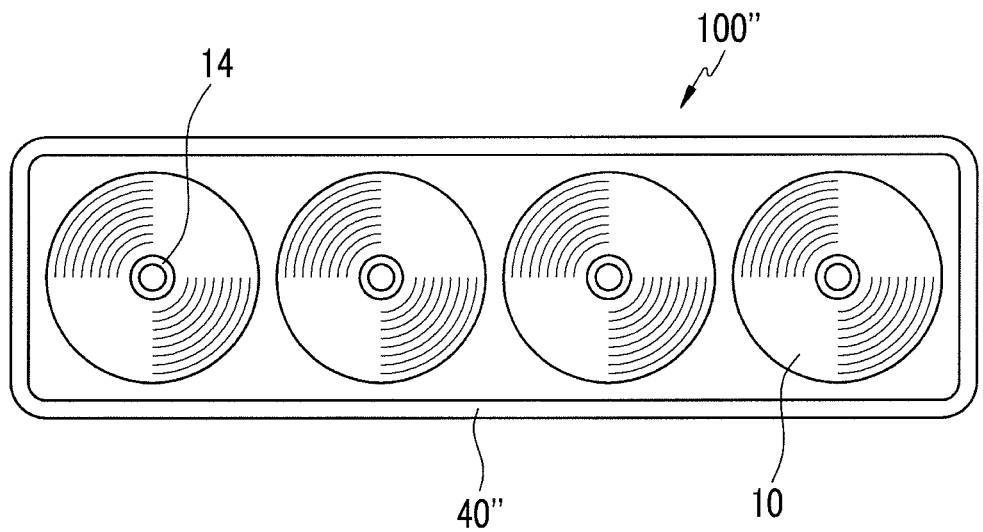
FIG. 6 is a cross-sectional view of a rechargeable battery according to another modification of the first embodiment.

An upper insulator 34 is interposed between the upper surface of the cap plate 50 and the electrode terminal 60 and between an electrode terminal opening 51 of the cap plate 50 and the electrode terminal 60 to electrically insulate the cap plate 50 and the electrode terminal 60 and to electrically insulate the electrode terminal opening 51 and the electrode terminal 60. FIG. 6 is a cross-sectional view of a rechargeable battery 100" according to another modification of the first embodiment. Referring to the rechargeable battery 100" shown in FIG. 6, can 40" may be provided in a cuboid prismatic shape such that one side is open in order to insert and accommodate a plurality of electrode assemblies 10. The other elements may be provided similar to those of the first embodiment.

Figure 7:
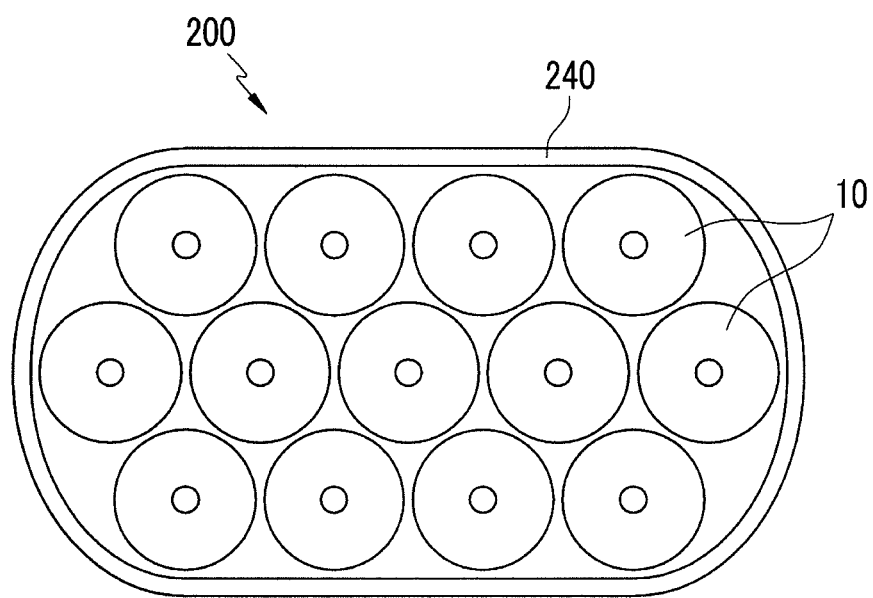
FIG. 7 is a cross-sectional view of a rechargeable battery according to a second embodiment.

FIG. 7 is a cross-sectional view of a rechargeable battery according to a second embodiment. Referring to FIG. 7, the rechargeable battery 200 according to the second embodiment includes the electrode assemblies 10 which are arranged so as to form a plurality of rows.

The rechargeable battery 100 according to the first embodiment is provided with electrode assemblies 10 in one row, and the can 40 is corresponding to the first row electrode assemblies 10 (See FIG. 4). In the rechargeable battery 200 according to the second embodiment, a plurality of rows of electrode assemblies 10 (for example, three rows) are provided, and the can 240 may be formed to have a structure corresponding to a plurality of rows of electrode assemblies 10 (See FIG. 6).

The rechargeable battery 200 according to the second embodiment shows the different disposition of the electrode assemblies 10 in a can 240 and accommodates more electrode assemblies 10 compared to the rechargeable battery 100 according to the first embodiment. Accordingly, the circuit devices and parts connecting to rechargeable batteries 200 from the outside may be decreased compared to the first embodiment.

Figure 8:
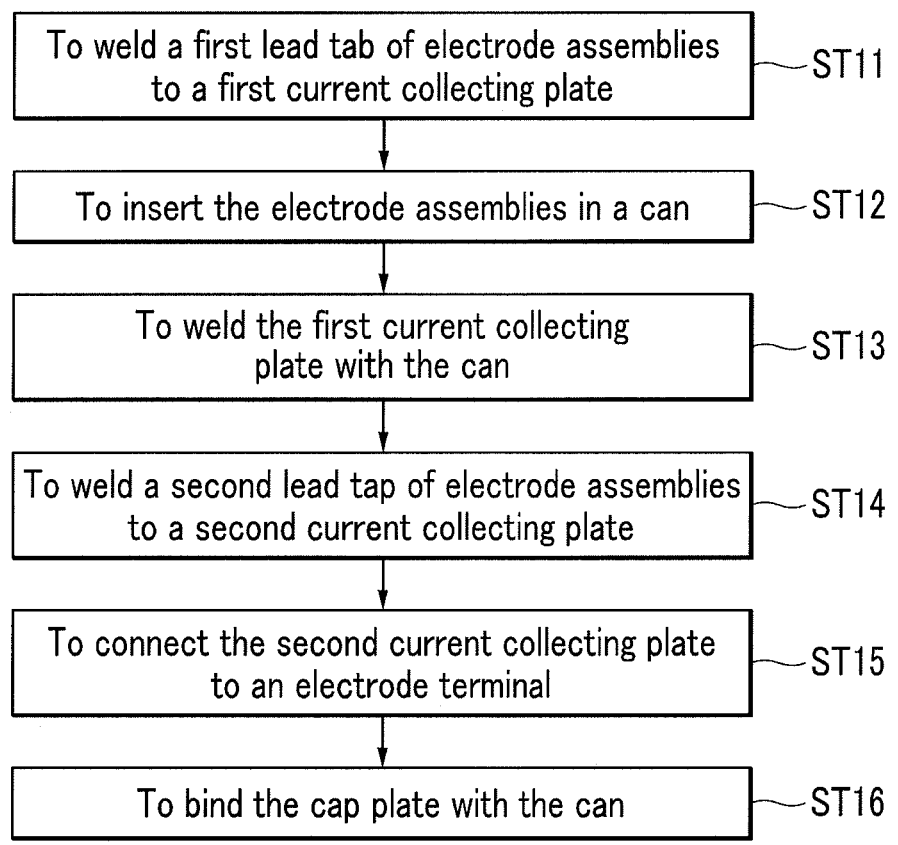
FIG. 8 is a flow chart showing a manufacturing process of a rechargeable battery according to the first embodiment.

FIG. 8 is a flow chart showing a manufacturing process of a rechargeable battery according to the first embodiment. For convenience, a method of manufacturing the rechargeable battery 100 according to the first embodiment is described. Depending on the embodiments, additional processes may be added, others removed, or the order of the processes changes. This applies to FIG. 9.

Referring to FIG. 8, a method of manufacturing a rechargeable battery 100 includes a first step (ST11) to a sixth step (ST16). The first step (ST11) is to weld each first lead tab 11c (negative lead tab) of the electrode assemblies 10 to a first current collecting plate 20 (lower current collecting plate).

The second step (ST12) is to insert the electrode assemblies 10 in the can 40 in the state of welding the lower current collecting plate 20 to the negative lead tap 11c.

The third step (ST13) is to weld and electrically connect the inserted lower current collecting plate 20 of the electrode assemblies 10 with the can 40. The second and third steps (ST12 and ST13) are to electrically connect the negative lead tabs 11c of the electrode assemblies 10 to the can 40 with interposing the lower current collecting plate 20.

The fourth step (ST14) is to weld a second lead tap 12c (positive lead tap) of the electrode assemblies 10 to a second current collecting plate 30 (upper current collecting plate) in the state of being inserted in the can 40. The fifth step (ST5) is to connect the upper current collecting plate 30 to an electrode terminal 60 of the cap plate 50 using a connection member 31. In other words, one end of the connection member 31 is welded to the upper current collecting plate 30 and rivet-connects a connecting opening 32 of the connection member 31 to the electrode terminal 60. The fourth and fifth steps (ST14 and ST15) electrically connect the positive lead tabs 12c of the electrode assemblies 10 to the electrode terminal 60 with interposing the connection member 31 and the upper current collecting plate 30. The sixth step (ST16) is to bind the cap plate 50 with the can 40 and to accommodate the electrode assemblies 10 in the can 40 and to seal the same.

Figure 9:
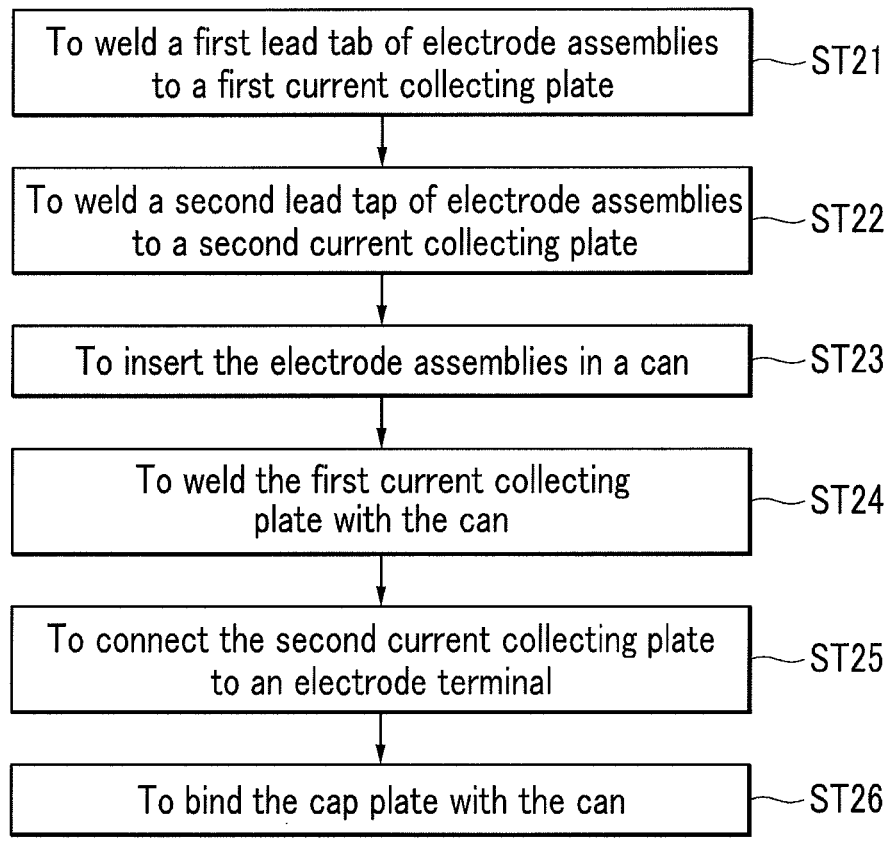
FIG. 9 is a flow chart showing a manufacturing process of a rechargeable battery according to the second embodiment.

FIG. 9 is a flow chart showing a manufacturing process of a rechargeable battery according to a second embodiment. The manufacturing method according to the first embodiment is to insert the electrode assembly 10 in which the lower current collecting plate 20 is connected to the negative lead tap 11c in the can 40 and to connect the positive lead tap 12c of the electrode assembly 10 to the upper current collecting plate 30.

The manufacturing method according to the second embodiment is to connect a lower current collecting plate 20 to a negative lead tap 11c and to insert the electrode assembly in which an upper current collecting plate 30 is connected to the positive lead tap 12c in a can 40.

Referring to FIG. 9, in the manufacturing method according to the second embodiment, the first step (ST21) is to weld each first lead tap 11c (negative lead tap) of the electrode assemblies 10 to the first current collecting plate 20 (lower current collecting plate).

The first step (ST21) is to electrically connect the negative lead taps 11c of the electrode assemblies 10 to the can 40 with interposing the lower current collecting plate 20. The second step (ST22) is to weld each second lead tap 12c (positive lead tap) of the electrode assemblies 10 to the second current collecting plate 30 (upper current collecting plate). The second step (ST22) is also to electrically connect the positive lead tap 12c of electrode assemblies 10 to the electrode terminal 60 with interposing a connection member 31 and the upper current collecting plate 30.

The third step (ST23) is to weld the negative lead tab 11c with the lower current collecting plate 20 and to insert the electrode assemblies 10 in the can 40 in the state of welding the positive lead tap 12c with the upper current collecting plate 30. The fourth step (ST24) is to weld the lower current collecting plate 20 to the can 40.

The fifth step (ST25) is to connect the upper current collecting plate 30 to an electrode terminal 60 of cap plate 50 using a connecting member 31. The sixth step (ST26) is to bind the cap plate 50 to the can 240, to accommodate the electrode assembly 10 in the can 40, and to seal the same.

According to at least one embodiment, it is possible to accomplish the high-capacity rechargeable battery having a unit cell by accommodating a plurality of low-capacity cylinder electrode assemblies in one can and coupling the same in parallel to minimize the width difference between positive electrode and negative electrode. Further, it is possible to decrease the number of circuit devices and parts connecting the rechargeable batteries from the outside, to ensure the safety of electrode assemblies even though the rechargeable battery is high-capacity, and to prevent the cell swelling generated in the conventional prismatic rechargeable battery.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A rechargeable battery, comprising:
  a first current collecting plate; a plurality of electrode assemblies electrically connected in parallel with each other via the first current collecting plate, wherein each of the electrode assemblies comprises two opposing ends and an outer surface of each electrode assembly formed between the two ends, and wherein the first current collecting plate is electrically connected to one of the two ends of the electrode assemblies;
  a plurality of first electrode tabs and a plurality of second electrode tabs respectively connected to the electrode assemblies, wherein each of the first and second electrode tabs comprises first and second ends opposing each other, wherein the first ends of the first tabs are connected to the outer surface of the respective electrode assembly, wherein the second ends of the first tabs are connected to the first current collecting plate, wherein the plurality of first electrode tabs and the plurality of second electrode tabs respectively are located at opposite ends of the corresponding electrode assembly and wherein each of the second ends of each second electrode tab is connected only to the innermost portion of the corresponding electrode assembly; and a can configured to accommodate the first current collecting plate and the plurality of electrode assemblies.

2. The battery of claim 1, wherein each of the electrode assemblies has a cylindrical shape.

3. The battery of claim 1, wherein the can comprises at least one non-linear portion, and wherein an inner surface of the non-linear portion faces the outer surface of at least one electrode assembly.

4. The battery of claim 3, wherein the non-linear portion comprises at least one curved side.

5. The battery of claim 4, wherein the curvature of the at least one curved side is substantially similar to that of the outer surface of each electrode assembly.

6. The battery of claim 4, wherein the at least one curved side contacts the outer surface of at least one electrode assembly.

7. The battery of claim 1, further comprising a second current collecting plate electrically connected to the other ends of the electrode assemblies.

8. The battery of claim 7, wherein each of the electrode assemblies comprises a positive electrode, a negative electrode and a separator interposed between the positive and negative electrodes, and wherein the positive and negative electrodes are electrically connected to the first and second current collecting plates, respectively.

9. The battery of claim 8, wherein each of the positive and negative electrodes comprises a coated region and an uncoated region, and wherein the width of the positive electrode coated region is less than the width of the negative electrode coated region.

10. The battery of claim 1, further comprising:
a cap plate configured to close the can;
an electrode terminal formed on the cap plate; and
a connection member configured to electrically connect the electrode terminal and the first current collecting plate, wherein the connection member is further configured to support the electrode assemblies so that the electrode assemblies do not move in the can.

11. The battery of claim 10, wherein the can comprises two opposing ends, wherein the cap plate is located on one end, wherein the electrode terminal is configured to perform as one of the positive and negative terminals of the battery, and wherein the other end of the can is configured to perform as the other terminal of the battery.

12. The battery of claim 1, wherein the electrode assemblies are arranged so as to form a single row inside the can.

13. The battery of claim 1, wherein the electrode assemblies are arranged so as to form a plurality of rows inside the can.

14. A rechargeable battery, comprising:
a first current collecting plate;
a plurality of cylinder-type electrode assemblies electrically connected in parallel with each other via the first current collecting plate, wherein each of the electrode assemblies comprises two opposing ends and a cylindrical outer surface, wherein the first current collecting plate is electrically connected to one of the two ends of the electrode assemblies, respectively, and wherein the electrode assemblies are not surrounded by an adhesive medium;
a plurality of electrode tabs respectively connected to the electrode assemblies, wherein each of the electrode tabs comprises first and second ends opposing each other, wherein the first end is connected to the cylindrical outer surface of the respective electrode assembly, wherein the second ends are connected to the first current collecting plate, wherein the first and second ends of each electrode tab are located at opposite ends of the corresponding electrode assembly, and wherein each of the second ends of each electrode tab is connected only to the innermost portion of the corresponding electrode assembly; and
a can configured to accommodate the first current collecting plate and the plurality of cylinder-type electrode assemblies, wherein the can is configured to sufficiently tightly support the electrode assemblies so that the electrode assemblies do not move inside the can.

15. The battery of claim 14, further comprising a second current collecting plate electrically connected to the other ends of the electrode assemblies.

16. The battery of claim 15, wherein the can comprises two opposing ends, and wherein the battery further comprises a cap plate configured to close one end of the can, and wherein the second current collecting plate is directly connected to the other end of the can.

17. The battery of claim 14, further comprising:
a cap plate configured to close the can;
an electrode terminal formed on the cap plate; and
a connection member configured to electrically connect the electrode terminal and the first current collecting plate, wherein the connection member is further configured to support the electrode assemblies so that the electrode assemblies do not move in the can.

18. The battery of claim 14, wherein the can comprises two curved sides, wherein each curved side has a curvature, and wherein the two curvatures are different.

19. The battery of claim 14, wherein the electrode assemblies are arranged so as to form a plurality of rows.

20. The battery of claim 14, wherein each of the electrode assemblies comprises a positive electrode, a negative electrode and a separator interposed between the positive and negative electrodes, wherein each of the positive and negative electrodes comprises a coated region and an uncoated region, and wherein the width of the positive electrode coated region is less than the width of the negative electrode coated region.

21. A rechargeable battery, comprising:
a first current collecting plate;
a second current collecting plate;
a plurality of electrode assemblies electrically connected in parallel with each other via the first and second current collecting plates, wherein each of the electrode assemblies comprises two opposing ends and an outer surface of each electrode assembly formed between the two ends, and wherein the first and second current collecting plates are electrically connected to the two ends of the electrode assemblies;
a plurality of electrode tabs respectively connected to the electrode assemblies, wherein each of the electrode tabs comprises first and second ends opposing each other, wherein the first end is connected to the outer surface of the respective electrode assembly, wherein the second ends are connected to one of the first and second current collecting plates, wherein the first and second ends of each electrode tab are located at opposite ends of the corresponding electrode assembly, and wherein each of the second ends of each electrode tab is connected only to the innermost portion of the corresponding electrode assembly;
a can, comprising two opposing ends, configured to accommodate the two current collecting plates and the plurality of electrode assemblies, wherein the can comprises at least one non-linear portion, and wherein an inner surface of the non-linear portion faces the outer surface of at least one electrode assembly; and
a cap plate configured to close one end of the can, wherein one of the two current collecting plates is directly connected to the other end of the can.

22. The battery of claim 1, wherein the first current collecting plate does not directly contact any of the electrode assemblies.

23. A rechargeable battery, comprising:
a first current collecting plate;
a plurality of electrode assemblies electrically connected in parallel with each other via the first current collecting plate, wherein each of the electrode assemblies comprises two opposing ends and an outer surface of each electrode assembly formed between the two ends, and wherein the first current collecting plate is electrically connected to one of the two ends of the electrode assemblies;
a plurality of electrode tabs respectively connected to the electrode assemblies, wherein each of the electrode tabs comprises first and second ends opposing each other, wherein the first end is connected to the outer surface of the respective electrode assembly, wherein the second ends are connected to the first current collecting plate, and wherein the first and second ends of each electrode tab are located at opposite ends of the corresponding electrode assembly;

a can configured to accommodate the first current collecting plate and the plurality of electrode assemblies; and a sector pin disposed in the innermost portion of each electrode assembly, wherein each of the second ends of each electrode tab is connected only to the sector pin.

* * * * *